United States Patent
Miyagawa et al.

(10) Patent No.: US 11,470,207 B2
(45) Date of Patent: Oct. 11, 2022

(54) IMAGE PROCESSING APPARATUS, IMAGE PROCESSING SYSTEM, IMAGE PROCESSING METHOD, AND NON-TRANSITORY COMPUTER-READABLE STORAGE MEDIUM

(71) Applicants: Hiromitsu Miyagawa, Kanagawa (JP); Tadashi Kitai, Kanagawa (JP)

(72) Inventors: Hiromitsu Miyagawa, Kanagawa (JP); Tadashi Kitai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/337,423

(22) Filed: Jun. 3, 2021

(65) Prior Publication Data

US 2022/0014633 A1 Jan. 13, 2022

(30) Foreign Application Priority Data

Jul. 7, 2020 (JP) .............................. JP2020-117289

(51) Int. Cl.
*H04N 1/46* (2006.01)
*H04N 1/00* (2006.01)

(52) U.S. Cl.
CPC ..... *H04N 1/00045* (2013.01); *H04N 1/00005* (2013.01); *H04N 1/0066* (2013.01); *H04N 1/00087* (2013.01); *H04N 1/00748* (2013.01)

(58) Field of Classification Search
CPC .......... H04N 1/00045; H04N 1/00005; H04N 1/00087; H04N 1/0066; H04N 1/00748
See application file for complete search history.

(56) References Cited

U.S. PATENT DOCUMENTS

| 2012/0147397 A1* | 6/2012 | Kawamoto .......... H04N 1/6033 358/1.9 |
| 2012/0162649 A1 | 6/2012 | Ishizaki et al. |
| 2012/0243796 A1* | 9/2012 | Saito ....................... G06T 5/006 382/218 |

(Continued)

FOREIGN PATENT DOCUMENTS

| JP | 2012-006349 | 1/2012 |
| JP | 2020-038483 A | 3/2020 |
| WO | 2014/042280 A1 | 3/2014 |

OTHER PUBLICATIONS

Extended European Search Report dated Oct. 27, 2021 in European Patent Application No. 21171700.4, 8 pages.

*Primary Examiner* — Moustapha Diaby
(74) *Attorney, Agent, or Firm* — Xsensus LLP

(57) ABSTRACT

An image processing apparatus includes circuitry. The circuitry is configured to acquire an output target image to be formed and output. The circuitry is configured to generate an image for inspection from the output target image. The circuitry is configured to add a reference point image to an area of the image for inspection in a case in which the circuitry fails to set a reference point based on the image for inspection. The circuitry is configured to align the reference point added to the image for inspection and the reference point image of a read image of the output target image formed on a recording medium with the reference point image added in response to adding the reference point image to the image for inspection, to compare the image for inspection with the read image to perform inspection.

10 Claims, 13 Drawing Sheets

(56) References Cited

U.S. PATENT DOCUMENTS

| | | |
|---|---|---|
| 2013/0016374 A1 | 1/2013 | Kawamoto et al. |
| 2013/0044342 A1* | 2/2013 | Kaneko .................. B41J 29/393 358/1.13 |
| 2013/0044347 A1* | 2/2013 | Kitai .................... H04N 1/3878 358/1.14 |
| 2013/0250319 A1* | 9/2013 | Kaneko .................. G06T 7/001 358/1.9 |
| 2013/0250369 A1* | 9/2013 | Kitai ...................... G06T 7/001 358/405 |
| 2013/0250370 A1* | 9/2013 | Kojima ............... H04N 1/00005 358/405 |
| 2013/0250377 A1 | 9/2013 | Kitai et al. |
| 2013/0250378 A1 | 9/2013 | Kitai et al. |
| 2014/0036290 A1* | 2/2014 | Miyagawa ......... H04N 1/00047 358/1.13 |
| 2014/0079292 A1* | 3/2014 | Kaneko ............. H04N 1/00068 382/112 |
| 2014/0079293 A1 | 3/2014 | Kitai et al. |
| 2014/0268259 A1 | 9/2014 | Kitai |
| 2014/0268260 A1 | 9/2014 | Kitai et al. |
| 2014/0270396 A1 | 9/2014 | Miyagawa et al. |
| 2014/0313538 A1 | 10/2014 | Kitai et al. |
| 2014/0314281 A1* | 10/2014 | Kojima ................ H04N 1/0005 382/112 |
| 2014/0341437 A1* | 11/2014 | Araki ................... G06T 7/0008 382/112 |
| 2015/0063654 A1 | 3/2015 | Kitai |
| 2015/0063889 A1* | 3/2015 | Kojima .................. G03G 15/36 399/394 |
| 2015/0269719 A1 | 9/2015 | Kitai |
| 2016/0259998 A1 | 9/2016 | Miyagawa |
| 2017/0031636 A1 | 2/2017 | Kitai |
| 2019/0238724 A1* | 8/2019 | Fukase ................... G01J 3/462 |
| 2020/0058115 A1* | 2/2020 | Mimura .................. G06T 7/001 |

\* cited by examiner

| NUMBER | #1,1 | #2,1 | #3,1 | ... |
|---|---|---|---|---|
| X COORDINATE | | | | |
| Y COORDINATE | | | | |
| AVAILABILITY | OK | OK | NG | ... |

| | −1/4 | |
|---|---|---|
| −1/4 | 1 | −1/4 |
| | −1/4 | |

CORNER EXTRACTION POINTS

FIG. 12A

| -1 | -1 | -1 | -1 | -1 |
|---|---|---|---|---|
| -1 | -1 | -1 | -1 | -1 |
| -1 | -1 | 1 | 1 | 1 |
| -1 | -1 | 1 | 1 | 1 |
| -1 | -1 | 1 | 1 | 1 |

FIG. 12B

| -1 | -1 | -1 | -1 | -1 |
|---|---|---|---|---|
| -1 | -1 | -1 | -1 | -1 |
| 1 | 1 | 1 | -1 | -1 |
| 1 | 1 | 1 | -1 | -1 |
| 1 | 1 | 1 | -1 | -1 |

FIG. 12C

| -1 | -1 | 1 | 1 | 1 |
|---|---|---|---|---|
| -1 | -1 | 1 | 1 | 1 |
| -1 | -1 | 1 | 1 | 1 |
| -1 | -1 | -1 | -1 | -1 |
| -1 | -1 | -1 | -1 | -1 |

FIG. 12D

| 1 | 1 | 1 | -1 | -1 |
|---|---|---|---|---|
| 1 | 1 | 1 | -1 | -1 |
| 1 | 1 | 1 | -1 | -1 |
| -1 | -1 | -1 | -1 | -1 |
| -1 | -1 | -1 | -1 | -1 |

FIG. 13

| NUMBER | #1 | #2 | #3 | ... |
|---|---|---|---|---|
| X COORDINATE | | | | |
| Y COORDINATE | | | | |
| TARGET PLANE | B | R,G | R,G,B | ... |

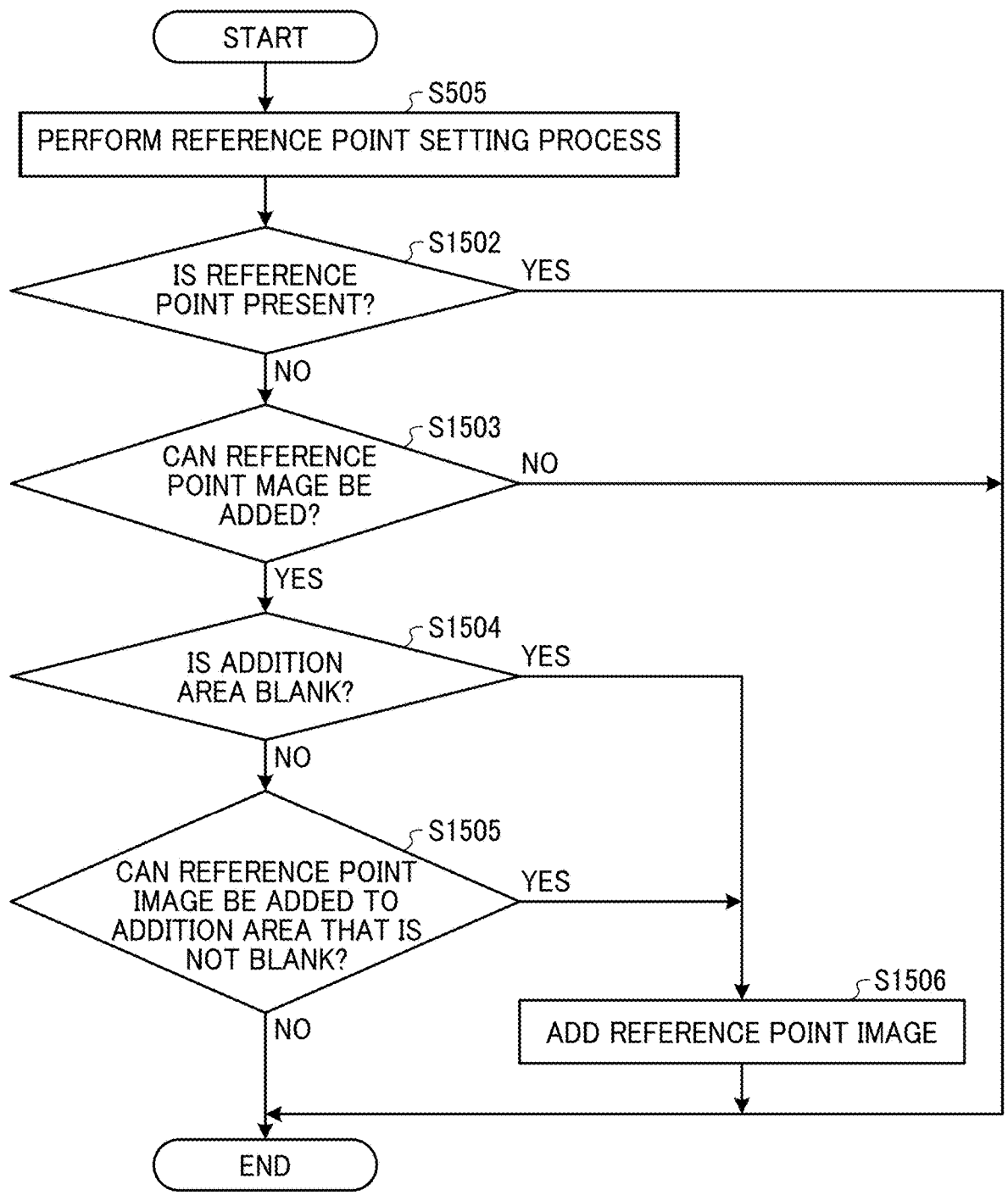

IMAGE PROCESSING APPARATUS, IMAGE PROCESSING SYSTEM, IMAGE PROCESSING METHOD, AND NON-TRANSITORY COMPUTER-READABLE STORAGE MEDIUM

CROSS-REFERENCE TO RELATED APPLICATION

This patent application is based on and claims priority pursuant to 35 U.S.C. § 119(a) to Japanese Patent Application No. 2020-117289, filed on Jul. 7, 2020, in the Japan Patent Office, the entire disclosure of which is hereby incorporated by reference herein.

BACKGROUND

Technical Field

Embodiments of the present disclosure relate to an image processing apparatus, an image processing system, an image processing method, and a non-transitory computer-readable storage medium storing computer-readable program code that causes a computer to perform the image processing method.

Related Art

There is a typical technique for aligning images to print a plurality of images on both sides of a recording medium and to compare the images on both sides of the recording medium.

SUMMARY

In one embodiment of the present disclosure, a novel image processing apparatus includes circuitry. The circuitry is configured to acquire an output target image to be formed and output. The circuitry is configured to generate an image for inspection from the output target image. The circuitry is configured to add a reference point image to an area of the image for inspection in a case in which the circuitry fails to set a reference point based on the image for inspection. The circuitry is configured to align the reference point added to the image for inspection and the reference point image of a read image of the output target image formed on a recording medium with the reference point image added in response to adding the reference point image to the image for inspection, to compare the image for inspection with the read image to perform inspection.

Also described are novel image processing system, image processing method, and non-transitory, computer-readable storage medium storing computer-readable program code that causes a computer to perform the image processing method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 12A is a diagram illustrating a first corner detection filter;

FIG. 12B is a diagram illustrating a second corner detection filter;

FIG. 12C is a diagram illustrating a third corner detection filter;

FIG. 12D is a diagram illustrating a fourth corner detection filter;

FIG. 13 is a corner coordinate table;

FIG. 14 is a flowchart of a reference point image addition process;

Figure 1:
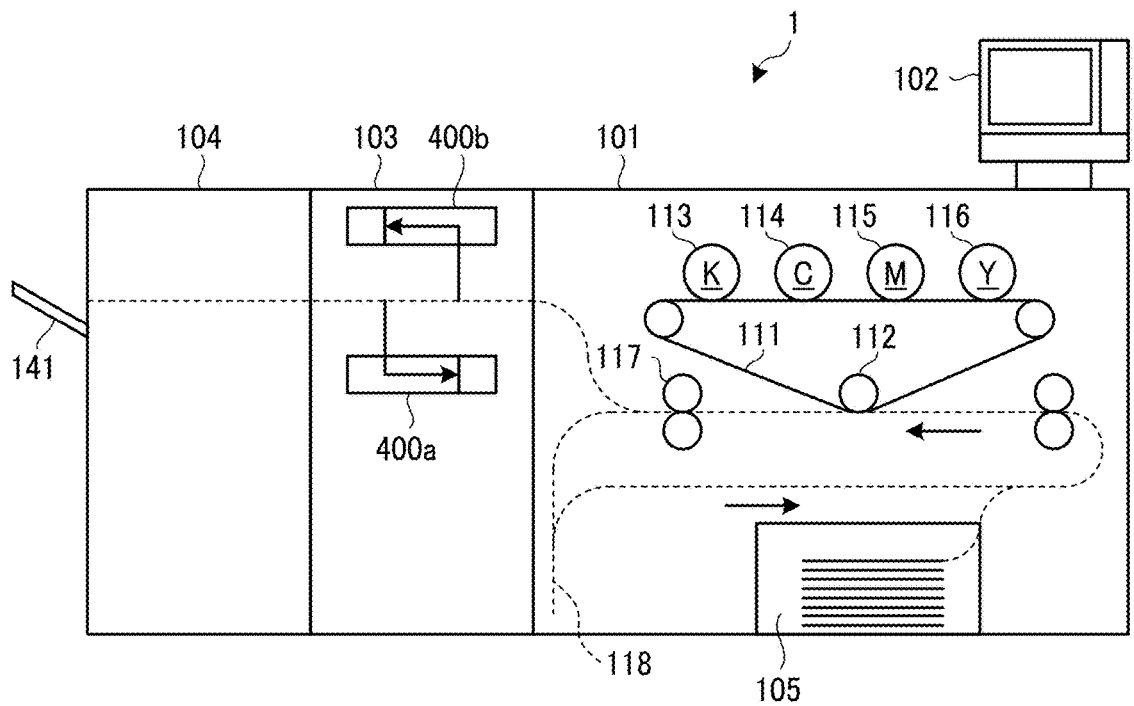
FIG. 1 is a diagram illustrating a configuration of an image processing system including an inspecting apparatus and a printer (as a printing apparatus) coupled to the inspecting apparatus according to an embodiment of the present disclosure.

The accompanying drawings are intended to depict embodiments of the present disclosure and should not be interpreted to limit the scope thereof The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

It is to be noted that, in the following description, suffixes Y, M, C, and K denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below. The following describes, as an example, a case in which an inspecting apparatus (as an image processing apparatus) and a printer (as an image forming apparatus) are applied to a system including a printing apparatus such as a production printing machine that continuously prints a large number of recording media in a short time. However, the embodiments of the present disclosure are not limited to such a case.

FIG. 1 is a diagram illustrating a configuration of an image processing system 1 including an inspecting apparatus 103 (as an image processing apparatus) and a printer 101 (as a printing apparatus and an image forming apparatus) coupled to the inspecting apparatus 103 according to an embodiment of the present disclosure.

The printer 101 is an apparatus that forms and outputs an image on a sheet or a recording medium. The printer 101 includes an operation device 102 such as a touch panel, a sheet feeder 105, a belt 111, a roller 112, a drum 113, a drum 114, a drum 115, a drum 116, a roller 117, and a reverse passage 118 defined by internal components of the printer 101. When receiving, in response to an operation via the operation device 102, print information (as a print job) including a print image (which is a raster image processor (RIP) image) from the outside or when receiving an instruction to execute a print job stored in the printer 101, the printer 101 executes the print job. The printer 101 conveys a sheet (as a recording medium) supplied from the sheet feeder 105 along a passage indicated by a dotted line in FIG. 1, according to the print job.

The drums 113, 114, 115, and 116 superimpose toner images of black (K), cyan (C), magenta (M), and yellow (Y), respectively, on the belt 111 one atop another to form a composite toner image on the belt 111. The roller 112 transfers the composite toner image from the belt 111 onto the sheet conveyed. The roller 117 fixes the composite toner image onto the sheet. Note that the drums 113, 114, 115, and 116 may be drums that bear toner images formed in an electrophotographic system, that is, in a series of electrophotographic processes including a charging process, an exposure process, and a developing process.

In the case of single-sided printing, the sheet is ejected to the inspecting apparatus 103 after the toner image is fixed onto the sheet. By contrast, in the case of double-sided printing, the sheet is reversed in the reverse passage 118 so that another toner image is transferred and fixed onto another side of the sheet. Finally, the sheet is ejected.

The inspecting apparatus 103 is an apparatus that inspects a sheet (as a recording medium) output by the printer 101 after the printer 101 prints on the sheet. Specifically, the inspecting apparatus 103 reads a print output from the printer 101 and checks whether printing is normally performed, based on the reading result. The inspecting apparatus 103 compares a read image obtained by the reading with a master image generated on the assumption of raster image processing, printing, and reading of document image data prepared by a user, thus inspecting the printing quality.

The inspecting apparatus 103 includes reading devices 400, specifically, a reading device 400a and a reading device 400b. The inspecting apparatus 103 is coupled to a sheet ejection stacker 104 and an output tray 141.

With the reading device 400a and the reading device 400b, the inspecting apparatus 103 reads print images printed on both sides of a sheet ejected from the printer 101. Then, the inspecting apparatus 103 ejects the sheet onto the output tray 141 of the sheet ejection stacker 104.

Figure 2:
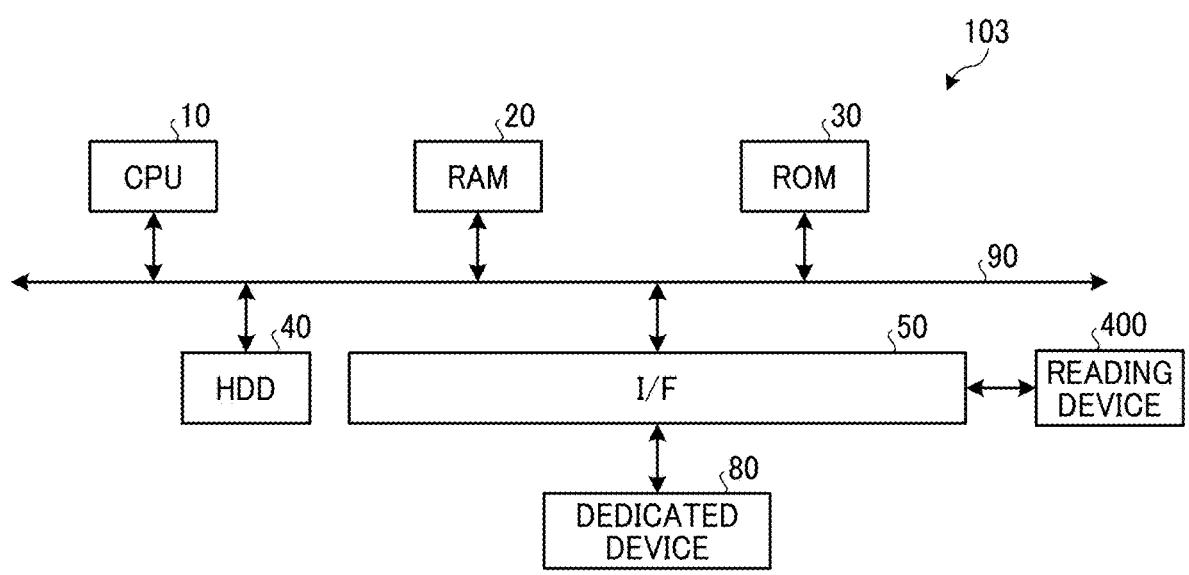
FIG. 2 is a block diagram illustrating a hardware configuration of the inspecting apparatus of FIG. 1.

Referring now to FIG. 2, a description is given of hardware components of the inspecting apparatus 103.

FIG. 2 is a block diagram illustrating a hardware configuration of the inspecting apparatus 103.

As illustrated in FIG. 2, the inspecting apparatus 103 has substantially the same hardware configuration as a hardware configuration of an information processing apparatus such as a general personal computer (PC) or server. That is, the inspecting apparatus 103 includes a central processing unit (CPU) 10, a random access memory (RAM) 20, a read only memory (ROM) 30, a hard disk drive (HDD) 40, and an interface (I/F) 50, which are connected to each other via a bus 90. The reading devices 400 and a dedicated device 80 are connected to the I/F 50.

The CPU 10 is an arithmetic unit and controls the entire operation of the inspecting apparatus 103. The RAM 20 is a volatile storage medium that allows data to be read and written at high speed. The CPU 10 uses the RAM 20 as a work area for data processing. The ROM 30 is a read-only, non-volatile storage medium that stores programs such as firmware. The HDD 40 is a non-volatile storage medium that allows data to be read and written. The HDD 40 stores an operating system (OS), various kinds of control programs, and application programs.

The I/F 50 connects the bus 90 to various kinds of hardware components or a network and controls the connection (i.e., the communication). The dedicated device 80 is an arithmetic device dedicated to high-speed image processing. Such an arithmetic device is configured as an application-specific integrated circuit (ASIC), for example. The image processing of the reading devices 400 that read an image output on a recording medium is also implemented by the dedicated device 80. The reading devices 400 are, e.g., line scanners disposed beside a conveyance passage defined by internal components of the inspecting apparatus 103.

In such a hardware configuration, the CPU 10 executes calculation according to a program stored in the ROM 30 or a program read from a storage medium such as the HDD 40 or an optical disk and loaded into the RAM 20, thus functioning a software controller. The software controller cooperates with the hardware to implement functions, illustrated as functional blocks, of the inspecting apparatus 103.

A program executed by the inspecting apparatus 103 of the present embodiment is stored in a computer-readable storage medium in an installable or executable file format and provided. Examples of the computer-readable storage medium include, but are not limited to, a compact disc read-only memory (CD-ROM), a flexible disk (FD), a compact disc recordable (CD-R), and a digital versatile disk (DVD).

Alternatively, the program executed by the inspecting apparatus 103 of the present embodiment may be stored on a computer connected to a network such as the Internet and downloaded via the network, to be provided. Alternatively, the program executed by the inspecting apparatus 103 of the present embodiment may be provided or distributed via a network such as the Internet.

Figure 3:
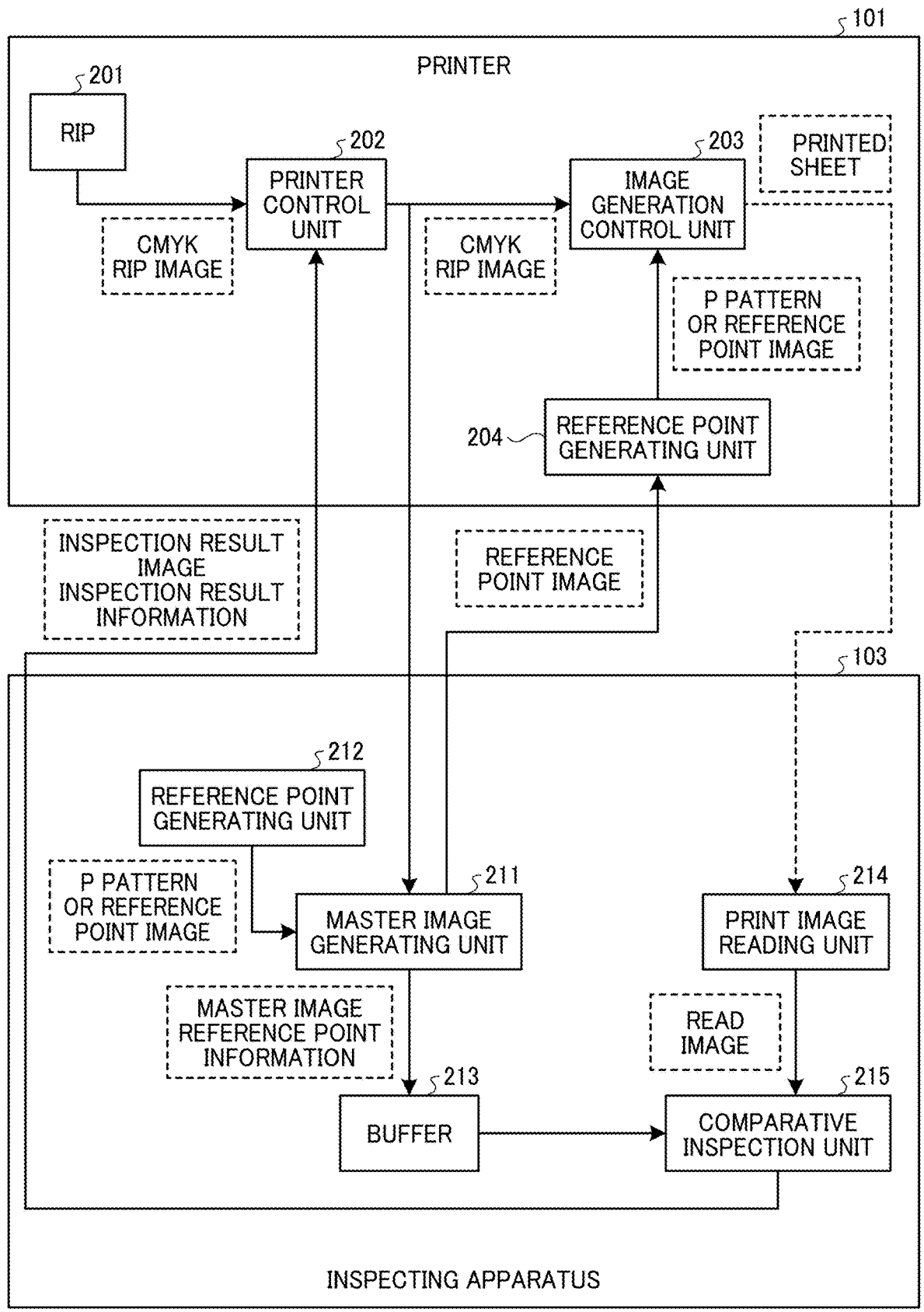
FIG. 3 is a block diagram illustrating a functional configuration of the printer and the inspecting apparatus constructing the image processing system of FIG. 1.

FIG. 3 is a block diagram illustrating a functional configuration of the printer 101 and the inspecting apparatus 103 constructing the image processing system 1 according to the present embodiment.

As illustrated in FIG. 3, the printer 101 according to the present embodiment includes an RIP 201, a printer control unit 202, an image generation control unit 203, and a reference point generating unit 204.

The RIP 201 is a so-called raster image processor. Based on image data included in a print job, the RIP 201 generates bitmap data (or an RIP image) for the printer 101 to execute image formation. For example, the RIP 201 acquires a page description language (PDL) such as PostScript or an image such as Tag Image File Format (TIFF) from, e.g., an external device and generates an RIP image having CMYK planes.

Here, the bit map data is information of pixels that constructs an image to be formed. The image generation control unit 203, which will be described later, executes image formation based on a binary image. On the other hand, the image data included in the print job is generally a multi-level image having 256 tones, for example. Therefore, the RIP 201 converts image data of a multilevel image into bitmap data of a binary image. Here, the bitmap data is, e.g., data of 1 bit for each of the CMYK colors and of 600 dots per inch (dpi).

The printer control unit 202 sends the RIP image acquired from the RIP 201 to the inspecting apparatus 103 and the image generation control unit 203. That is, when acquiring the RIP image from the RIP 201, the printer control unit 202 sends the acquired RIP image to the inspecting apparatus 103 and the image generation control unit 203. Thus, the printer control unit 202 distributes the RIP image to the image generation control unit 203 and the inspecting apparatus 103. The printer control unit 202 also acquires a result of inspection performed by the inspecting apparatus 103.

The RIP image is printed on a recording medium by the image generation control unit 203. That is, the RIP image serves as an output target image to be formed and output. The printer control unit 202 sends the RIP image to the inspecting apparatus 103. That is, the printer control unit 202 functions as an output target image sending unit.

The image generation control unit 203 forms an image on a recording medium (e.g., a sheet of paper) according to the RIP image acquired from the printer control unit 202 and outputs, as a printed matter, the printed sheet, which is the recording medium bearing the image. Note that, in the present embodiment, the printer 101 forms an image by electrophotography. Alternatively, however, the printer 101 may employ an inkjet printing system to form an image.

The image generation control unit 203 edits the RIP image in response to an instruction from the reference point generating unit 204 and executes image formation. For example, in response to an instruction from the reference point generating unit 204, the image generation control unit 203 adds a P pattern having an encoded number unique to a printing apparatus to a Y plane of the RIP image to generate a combined image. Here, the P pattern is a yellow pattern that is difficult to recognize with human eyes. The image generation control unit 203 forms the combined image on a recording medium. That is, on the recording medium, the P pattern is superimposed on the image to be output.

Figure 4:
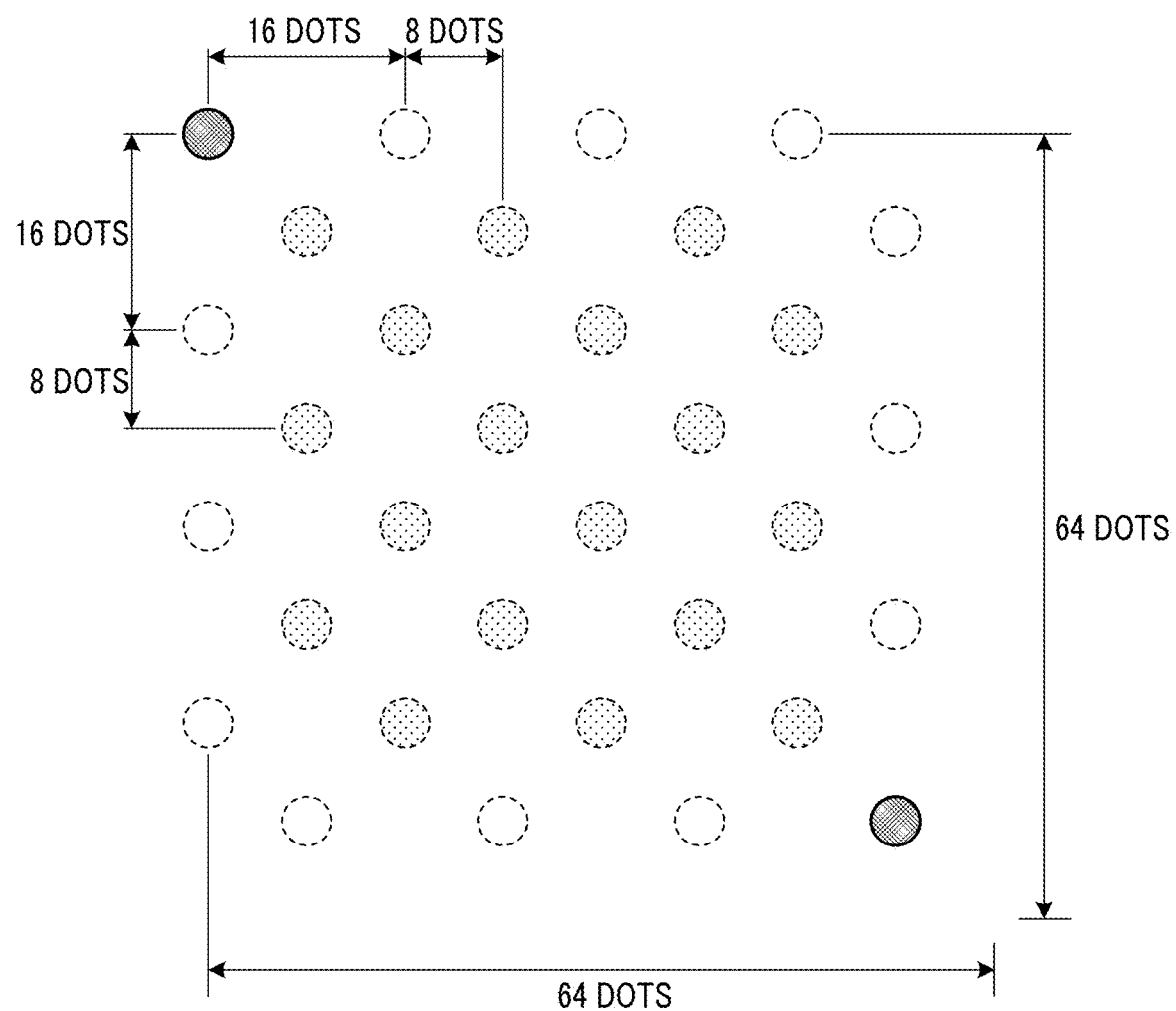
FIG. 4 is a diagram illustrating one unit of a P pattern.

Referring now to FIG. 4, a description is given of the P pattern.

FIG. 4 is a diagram illustrating one unit of the P pattern according to the present embodiment.

As illustrated in FIG. 4, the P pattern according to the present embodiment is a pattern represented by 64 dots×64 dots. Each circle illustrated in FIG. 4 is represented by 2 dots×2 dots. The P pattern is used to specify an apparatus that has formed and output an image on a sheet, for example. Therefore, a pattern is formed as a P pattern based on a different code for each apparatus.

The black circles illustrated in FIG. 4 are marks for identifying a range of the pattern of one unit. The black circles are formed regardless of the code content. Like the black circles, the white circles illustrated in FIG. 4 are marks for identifying the range of the pattern of one unit. However, unlike the black circles, the white circles are not formed regardless of the code content. The gray circles illustrated in FIG. 4 are marks formed as a pattern for specifying the apparatus as described above. A black circle is formed according to the code content. Although FIG. 4 illustrates black circles to simplify the illustration, the P pattern is a yellow pattern as described above and is actually formed in yellow.

Figure 5:
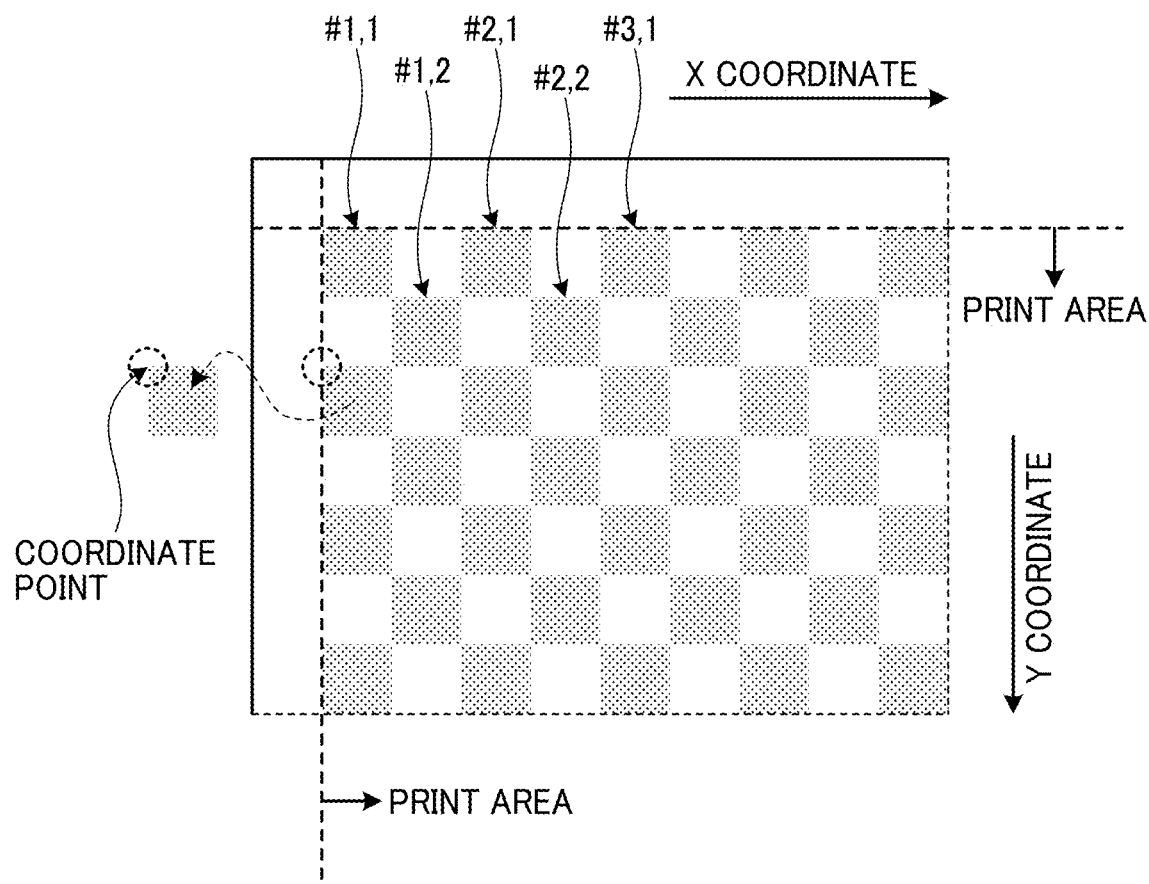
FIG. 5 is a diagram illustrating a part of a sheet bearing the P patterns of FIG. 4.

FIG. 5 is a diagram illustrating a part of a sheet bearing the P patterns according to the present embodiment.

Each gray square illustrated in FIG. 5 is the P pattern illustrated in FIG. 4. As illustrated in FIG. 5, the P patterns according to the present embodiment are arranged in a staggered manner from an end of a print area. In a case in which the RIP image includes black (K) alone, the P patterns are not added. The P patterns thus formed are detected from both a read image and a master image and defined as reference points to align the read image with the master image.

In a case in which a target image includes a characteristic portion, a reference point for alignment may be specified from the target image. However, the reference point may not always be specified from the target image.

For example, it is difficult to recognize the patterns overlapping an image to be formed. In particular, in a case in which an image has a yellowish background, the patterns are hardly recognized or defined as the reference point described above. Similarly, in a case in which a sheet on which an image is to be output has a yellowish color, the patterns are hardly recognized, thus hampering the alignment of the read image and the master image. In such situations, the embodiments of the present disclosure enable the alignment of the read image and the master image. In FIG. 5, each of the P patterns is assigned an identification number such as "#1, 1" and "#1, 2." A detailed description of the identification number is deferred.

Referring back to FIG. 3, when acquiring a reference point image from the reference point generating unit 204, the image generation control unit 203 adds the reference point image to a given position of the RIP image.

Specifically, in response to an instruction from the reference point generating unit 204, the image generation control unit 203 adds the P pattern or the reference point image to the RIP image. Then, the image generation control unit 203 forms, on a recording medium, the RIP image to which the P pattern or the reference point image is added. The image generation control unit 203 sends the recording medium as a printed sheet to the inspecting apparatus 103. As described above, the image generation control unit 203 forms and outputs an RIP image on a recording medium. In response to an instruction from the reference point generating unit 204, the image generation control unit 203 adds a P pattern or a reference point image to the RIP image to generate a combined image the RIP image and the P pattern or the reference point image. The image generation control unit 203 forms and outputs the combined image. Thus, the image generation control unit 203 functions as an image forming and outputting unit.

The reference point generating unit 204 gives an instruction on the RIP image to the image generation control unit 203. In response to a notification, from a master image generating unit 211 of the inspecting apparatus 103, indicating that the reference point is set, the reference point generating unit 204 instructs the image generation control unit 203 to synthesize the P pattern and the RIP image. When receiving a reference point image from the master image generating unit 211 of the inspecting apparatus 103 by a reference point image addition process described later, the reference point generating unit 204 sends the reference point image to the image generation control unit 203 while instructing the image generation control unit 203 to add the reference point image. Thus, in response to the master image generating unit 211 adding the reference point image to the master image, the reference point generating unit 204 causes the image generation control unit 203 to add the reference point image to the RIP image.

With continued reference to FIG. 3, a description is given of a functional configuration of the inspecting apparatus 103.

The inspecting apparatus 103 includes the master image generating unit 211 serving as an inspection image generating unit, a reference point generating unit 212, a buffer 213, a print image reading unit 214, and a comparative inspection unit 215 serving as an image inspecting unit.

The master image generating unit 211 acquires the binary image (i.e., the RIP image) input from the printer 101 as described above to generate a master image. The master image is an inspection image, which is an image for inspection, to be compared with an inspection target image (i.e., a read image). The master image generated by the master image generating unit 211 is, e.g., data of 8 bits for each of red, green, and blue (RGB) colors and of 200 dpi. The master image generating unit 211 is implemented by execution of a program by the CPU 10 illustrated in FIG. 2, for example.

While generating a master image based on the binary image input from the printer 101 as described above, the master image generating unit 211 edits the master image to determine a reference for aligning the read image and the master image. A detailed description of a process of editing the master image is deferred. The master image generating unit 211 registers, in the buffer 213, the master image and reference point information serving as a reference for the alignment.

The reference point generating unit 212 sends, to the master image generating unit 211, information for determining a reference that allows alignment with the master image. The reference point generating unit 212 generates a P pattern as illustrated in FIG. 4, for example, and sends the P pattern or a reference point image to the master image generating unit 211. The reference point generating unit 212 is implemented by execution of a program by the CPU 10 illustrated in FIG. 2.

The buffer 213 stores information generated by the master image generating unit 211. The buffer 213 is implemented by the RAM 20 or the HDD 40 illustrated in FIG. 2.

The print image reading unit 214 reads an image formed on a recording medium, that is, an image on a printed sheet subjected to image formation (i.e., printing) and output from the printer 101. The print image reading unit 214 acquires the image as a read image. The read image acquired by the print image reading unit 214 is a target for the inspecting apparatus 103 to inspect. The read image acquired by the print image reading unit 214 is, e.g., data of 8 bits for each of RGB colors and of 200 dpi. The print image reading unit 214 is implemented by execution of a program by the CPU 10, the reading device 400, and the dedicated device 80 illustrated in FIG. 2.

The comparative inspection unit 215 compares the read image input from the print image reading unit 214 with the master image generated by the master image generating unit 211 to determine whether the image formation and output is executed as intended. That is, the comparative inspection unit 215 compares the read image input from the print image reading unit 214 with the master image generated by the master image generating unit 211 to perform inspection. The comparative inspection unit 215 is implemented by execution of a program by the CPU 10 illustrated in FIG. 2, for example.

Figures 6, 7:
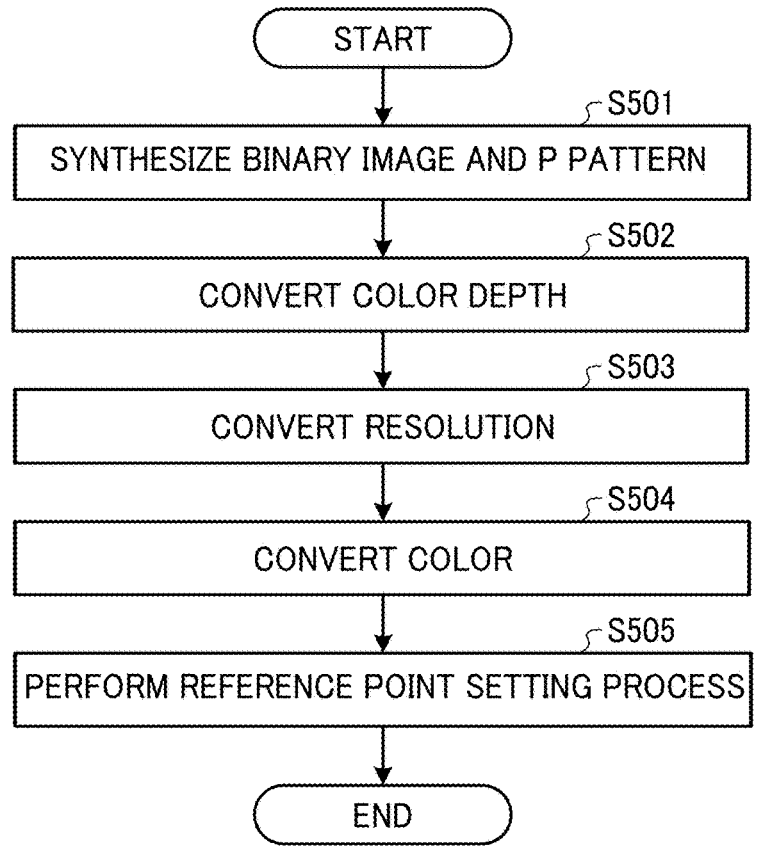
FIG. 6 is a flowchart of an operation of generating a master image.
FIG. 7 is a P pattern availability table.

Referring now to FIG. 6, a description is given of an operation of generating a master image by the master image generating unit 211.

FIG. 6 is a flowchart of an operation of generating a master image according to the present embodiment.

As illustrated in FIG. 6, in step S501, when acquiring a binary image from the printer 101, the master image generating unit 211 acquires, from the reference point generating unit 212, the image information of the P pattern described above with reference to FIGS. 4 and superimposes the P pattern on the binary image, thus synthesizing the binary image and the P pattern as described above with reference to FIG. 5. Note that each of the binary image and the P pattern has 600 dpi.

In step S501, the master image generating unit 211 assigns, to each of the P patterns of one unit, an identification number such as "#1, 1" and "#1, 2" illustrated in FIG. 5. Then, the master image generating unit 211 confirms whether an area to which the P pattern corresponding to each identification number is given is blank in the K and Y planes of the image represented by the CMYK binary values acquired from the printer 101. Based on the confirmation result, the master image generating unit 211 generates a P pattern availability table, which is a table presenting whether the P pattern corresponding to each identification number is available as a reference point for alignment.

FIG. 7 is an example of the P pattern availability table according to the present embodiment.

As illustrated in FIG. 7, the P pattern availability table according to the present embodiment is information associating, with each other, "pattern number" indicating each identification number illustrated in FIG. 5, "coordinates" indicating a position to which each pattern number is given, and "availability" indicating whether the P pattern corresponding to each pattern number can be used as a reference point.

Note that the master image generating unit 211 determines that the P pattern is available as a reference point when an area to which the P pattern corresponding to each identification number is given is blank in both K and Y planes. As the "coordinates" in the P pattern availability table, used are the coordinates of the upper left corner of each of the P patterns illustrated as a square in FIG. 5, that is, the coordinates of the upper left black circle illustrated in FIG. 4, for example. Here, in a case in which the resolution is changed in the generation of the master image, a value obtained by multiplying or dividing according to the change in the resolution is stored as the "coordinates." For example, in a case in which a 200 dpi master image is generated based on a binary image received at 600 dpi, a value obtained by dividing the value of the original coordinates by 3 (and rounding down the quotient to the decimal point) is stored as "coordinates".

After completing the operation of step S501, in step S502, the master image generating unit 211 converts the CMYK binary image, which is an image constructed of 1-bit pixels, into an image constructed of 8-bit pixels. In short, the master image generating unit 211 converts the color depth.

In step S503, the master image generating unit 211 converts the resolution of the 600 dpi image to 200 dpi, which is the reading resolution of the scanner. In step S504, the master image generating unit 211 converts the image constructed of 8-bit CMYK pixels into an image constructed of 24-bit RGB pixels. In short, the master image generating unit 211 converts the color.

By the operations of steps S502 to S504, the master image generating unit 211 converts the image input in the CMYK binary format into an image in a format corresponding to the read image generated by the print image reading unit 214, thus generating a master image.

Thereafter, in step S505, the master image generating unit 211 performs a reference point setting process to align the generated master image and the read image on the master image.

Figure 8:
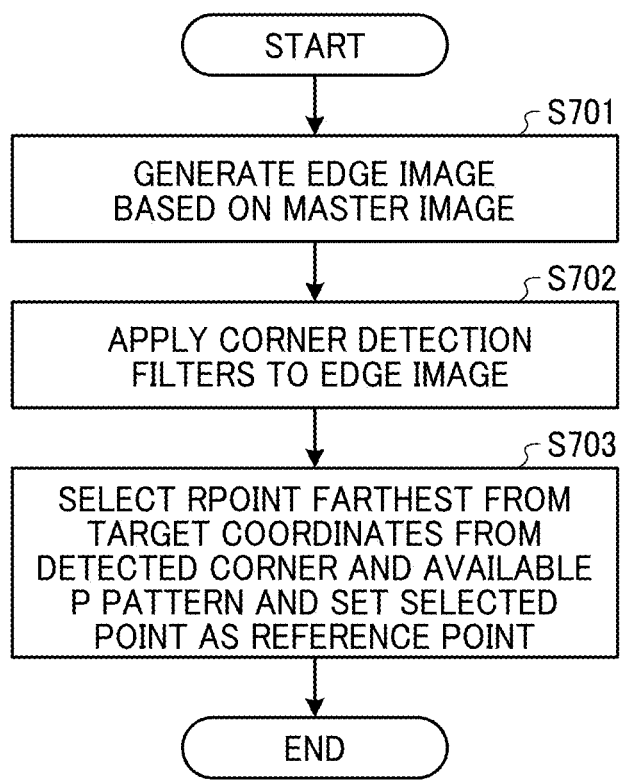
FIG. 8 is a detailed flowchart of a reference point setting process.

Referring now to FIG. 8, a detailed description is given of the reference point setting process.

FIG. 8 is a detailed flowchart of the reference point setting process according to the present embodiment.

As illustrated in FIG. 8, firstly, in step S701, the master image generating unit 211 generates an edge image based on the generated master image.

Figures 9, 10:
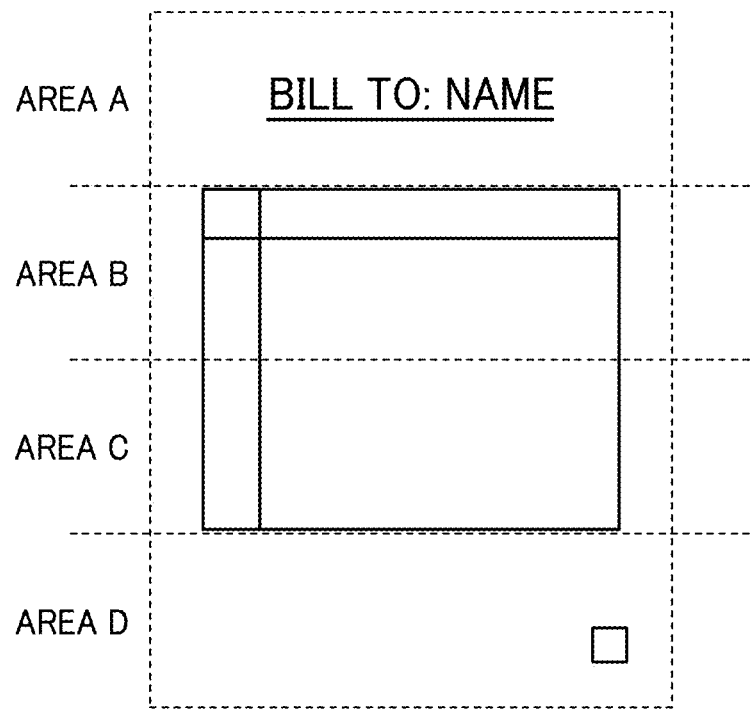
FIG. 9 is a diagram illustrating an aspect of area segmentation of an image to be processed.
FIG. 10 is a diagram illustrating an edge extraction filter.

Referring now to FIG. 9, a description is given of a user image serving as a source of a master image (i.e., image data included in a print job) and a reference point setting area, which is an area for setting a reference point position.

FIG. 9 is a diagram illustrating an aspect of area segmentation of an image to be processed according to the present embodiment.

As illustrated in FIG. 9, the master image generating unit 211 divides a master image of a user image related to a bill into areas A to D to set reference point positions. The master image generating unit 211 sets, as a reference point, a point far from the center of the entire image for each of the areas A to D. Note that the reference point setting area and the target coordinates of the reference point are freely settable.

In step S701, the master image generating unit 211 applies a filter as illustrated in FIG. 10 to the master image to generate an edge image.

FIG. 10 is a diagram illustrating an edge extraction filter according to the present embodiment.

For example, the master image generating unit 211 causes the filter as illustrated in FIG. 10 to act on all the pixels for each of the RGB planes of the master image, to generate the edge image. The filter illustrated in FIG. 10 is a general filter for extracting an edge of an image (that is, a shape included in a mask image) based on the difference between adjacent pixels.

Figure 11A:
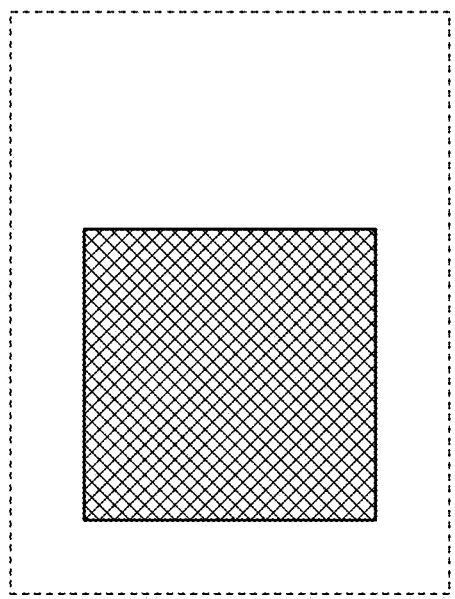
FIG. 11A is a diagram illustrating an original image.
Figure 11B:
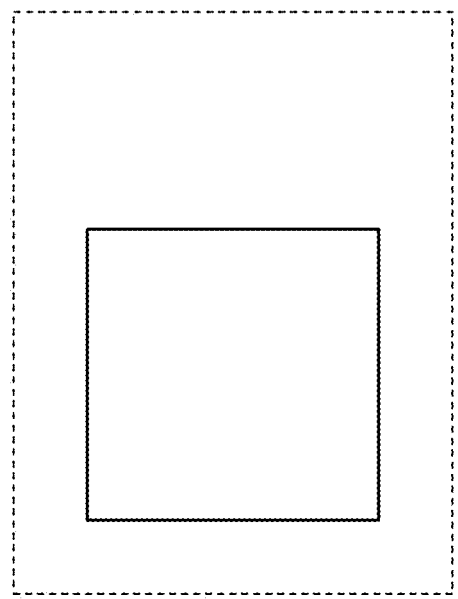
FIG. 11B is a diagram illustrating an edge image.
Figure 11C:
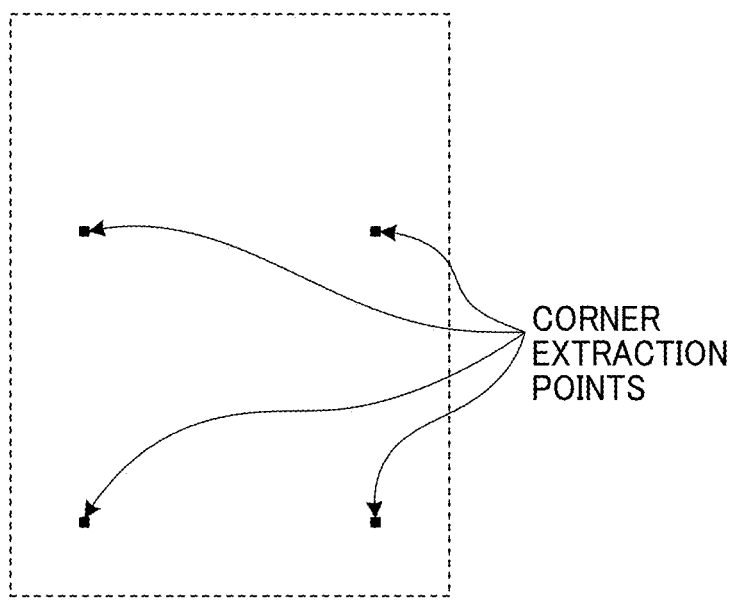
FIG. 11C is a diagram illustrating a corner detection image.

Referring now to FIGS. 11A to 11C, a description is given of aspects of edge extraction and corner extraction.

FIGS. 11A to 11C are diagrams illustrating the aspects of edge extraction and corner extraction. Specifically, FIG. 11A is a diagram illustrating an original image. FIG. 11B is a diagram illustrating an edge image. FIG. 11C is a diagram illustrating a corner detection image.

For example, the master image generating unit 211 applies the filter as illustrated in FIG. 10 to the image (i.e., the original image) as illustrated in FIG. 11A to extract an edge as illustrated in FIG. 11B.

After extracting the edge, the master image generating unit 211 detects corners of the edge with a corner detection filter.

FIGS. 12A to 12D illustrates examples of the corner detection filter according to the present embodiment.

Specifically, FIG. 12A is a diagram illustrating a first corner detection filter. FIG. 12B is a diagram illustrating a second corner detection filter. FIG. 12C is a diagram illustrating a third corner detection filter. FIG. 12D is a diagram illustrating a fourth corner detection filter.

In step S702 illustrated in FIG. 8, the master image generating unit 211 causes the corner detection filters as illustrated in FIGS. 12A to 12D to act on all the pixels for each of the RGB planes of the edge image for each of the reference point setting areas such as the areas A to D illustrated in FIG. 9, to extract the corners of the edge in the edge image generated as described above. Like the filter illustrated in FIG. 10, the filters illustrated in FIGS. 12A to 12D are used to extract corners of an image (specifically, corners of a shape in an image) based on the difference between adjacent pixels.

The master image generating unit 211 applies such filters to the edge image to extract the corners (i.e., the pixels exceeding a given threshold) as illustrated in FIG. 11C from the edge image as illustrated in FIG. 11B. After extracting the corners as illustrated in FIG. 11C, the master image generating unit 211 generates, as a corner coordinate table, information of the extracted corner pixels serving as reference point candidate pixels.

FIG. 13 is an example of the corner coordinate table according to the present embodiment.

As illustrated in FIG. 13, the master image generating unit 211 generates, as the information of the reference point candidate pixels, the information including numbers (numbers for uniquely identifying the reference point candidate pixels), coordinates (X and Y coordinates) indicating the respective positions of the reference point candidate pixels, and target planes. The table illustrated in FIG. 13 includes the "coordinates" of the corners extracted by the master image generating unit 211 in association with the "number."

In the present embodiment, the filter illustrated in FIG. 10 and the filters illustrated in FIGS. 12A to 12D are used to extract an edge of an image and corners of an image, respectively, as an example. Any other ways may be used to extract an edge of an image and corners of an image.

Note that the master image generating unit 211 performs the operations of steps S701 and S702 for each of the RGB colors. Thus, the master image generating unit 211 generates a table as illustrated in FIG. 13 for each of the RGB colors. After completing the operation of step S702, in step S703, the master image generating unit 211 selects the coordinates farthest from the center of the image from the "coordinates" included in the P pattern availability table illustrated in FIG. 7 and the "coordinates" included in the table illustrated in FIG. 13 and sets the selected coordinates as a reference point, for each of the areas A to D illustrated in FIG. 9.

In the operation of step S703, the master image generating unit 211 obtains the interval between the coordinates of the center of the image and the "coordinates" included in the P pattern availability table illustrated in FIG. 7. The master image generating unit 211 also obtains the interval between the coordinates of the center of the image and the "coordinates" included in the table illustrated in FIG. 13. Then, the master image generating unit 211 selects the coordinates farthest from the coordinates of the center of the image, for each of the areas A to D. Alternatively, the priority order may be set among the coordinates for each of the areas A to D. In this case, the coordinates having the highest priority may be selected from the "coordinates" included in the P pattern availability table illustrated in FIG. 7 and the "coordinates" included in the table illustrated in FIG. 13.

By the operation of step S703, the master image generating unit 211 selects a reference point for each of the areas A to D. In other words, the master image generating unit 211 selects four reference points in total. Specifically, for each of the RGB colors, the master image generating unit 211 selects a reference point for each of the areas A to D, that is, four reference points in total. Then, the master image generating unit 211 generates information indicating how the selected reference points have been extracted. The master image generating unit 211 stores or sets, in a storage medium (e.g., the buffer 213), reference information, that is, table information (as a reference point selection result table) associating "plane" indicating any of the RGB, "area" indicating any of the areas A to D illustrated in FIG. 9, and selected "coordinates" with each other. Note that, in a case in which the master image generating unit 211 fails to select or set a reference point for each of the areas A to D, that is, four reference points in total, the master image generating unit 211 executes a process of adding a reference point image, that is, the reference point image addition process. A detailed description of the reference point image addition process is deferred.

The master image generating unit 211 performs the operations described above to complete generation of a master image and selection or setting of reference points. The master image generating unit 211 inputs the generated master image and the reference point selection result table to the buffer 213. Such an input allows the comparative inspection unit 215 to execute the comparative inspection with reference to the master image and the reference point selection result table. As described above, the master image generating unit 211 superimposes a P pattern on a binary image, thus combining or synthesizing the P pattern and the binary image. The master image generating unit 211 then generates an edge image from the master image and detects corners from the edge image. When extracting the corners as reference points, the master image generating unit 211 stores, in the buffer 213, a reference point selection result table based on the extracted result.

Referring now to a flowchart illustrated in FIG. 14, a description is given of the reference point image addition process. As described above, the reference point image addition process is performed based on whether the reference point has been extracted from the master image.

FIG. 14 is a flowchart of the reference point image addition process according to the present embodiment.

First, in step S505, the master image generating unit 211 cooperates with the reference point generating unit 212 to execute the reference point setting process as in the flowcharts illustrated in FIGS. 6 and 8.

When the master image generating unit 211 succeeds in setting a reference point (YES in step S1502), the master image generating unit 211 notifies the printer 101 that the reference point is set and ends the process. Note that, in response to the notification that the reference point is set, the reference point generating unit 204 of the printer 101 instructs the image generation control unit 203 to synthesize a P pattern and an RIP image.

By contrast, when the master image generating unit 211 fails to set a reference point as a result of execution of the reference point setting process (NO in step S1502), the process proceeds to step S1503.

In step S1503, the master image generating unit 211 determines whether a user has set that a reference point image can be added. When the user has not yet set that the reference point image can be added (NO in step S1503), the process ends.

By contrast, when the user has set that the reference point image can be added (YES in step S1503), the process proceeds to step S1504.

In step S1504, the master image generating unit 211 determines whether a given addition area, which is a given target area to which the reference point image is to be added, is blank. The given addition area is each side of an image, for example. Note that the operation of step S1503 may be omitted.

When the master image generating unit 211 determines that the given addition area is blank (YES in step S1504), in step S1506, the master image generating unit 211 acquires a reference point image from the reference point generating unit 212 and adds the reference point image to the master image. The master image generating unit 211 sends the reference point image to the printer 101 and ends the process. The reference point generating unit 204 of the printer 101 sends the reference point image acquired from the master image generating unit 211 to the image generation control unit 203. The image generation control unit 203 adds the reference point image to the RIP image. Note that, when acquiring the reference point image from master image generating unit 211, the reference point generating unit 204 of the printer 101 may instruct the image generation control unit 203 to synthesize the P pattern and the RIP image. In this case, the image generation control unit 203 adds the P pattern to the RIP image.

Note that, in a case in which the printer 101 stores a reference point image in advance and the size of the reference point image is fixed, in step S1506, the master image generating unit 211 may send, to the printer 101, an instruction indicating a request for adding the reference point image, instead of sending the reference point image to the printer 101. In step S1506, the master image generating unit 211 may also send, to the printer 101, information indicating a position to which the reference point image is to be added.

As described above, in a case in which the master image generating unit 211 fails to extract a reference point portion from a master image in step S505, the master image generating unit 211 adds a reference point image to a given area (e.g., a blank area) of the master image and sends, to the printer 101, the information on the addition of the reference point such as the reference point image or an instruction indicating a request for adding the reference point image.

By contrast, when the master image generating unit 211 determines that the given addition area is not blank (that is, the given addition area is not a blank area) (NO in step S1504), in step S1505, the master image generating unit 211 determines whether the reference point image can be added to the addition area that is not blank. One of the conditions for determining that the reference point image can be added to the addition area that is not blank in step S1505 is that the addition area is a margin area. The margin area is, e.g., an area for paper cutting.

When the master image generating unit 211 determines that the given addition area is a margin area (YES in step S1505), the process proceeds to step S1506. By contrast, when the master image generating unit 211 determines that the given addition area is not a margin area (NO in step S1505), the process ends.

Here, the reference point image described above may be any pattern provided that the reference point image includes information for specifying an X direction of an image and a Y direction of the image when the image is compared and inspected. Since the comparative inspection of an image may be performed for each segment (or block) of the image as illustrated in FIG. 9, the reference point image is a pattern that is detectable for each block.

Figure 15A:
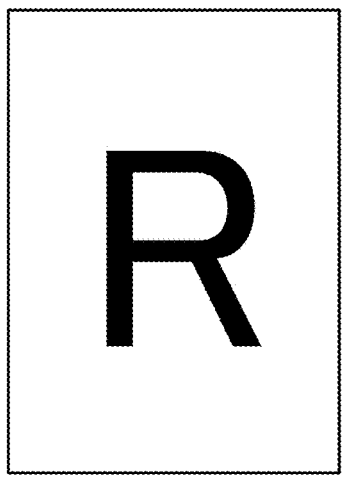
FIG. 15A is a diagram illustrating a raster image processor (RIP) image.
Figure 15B:
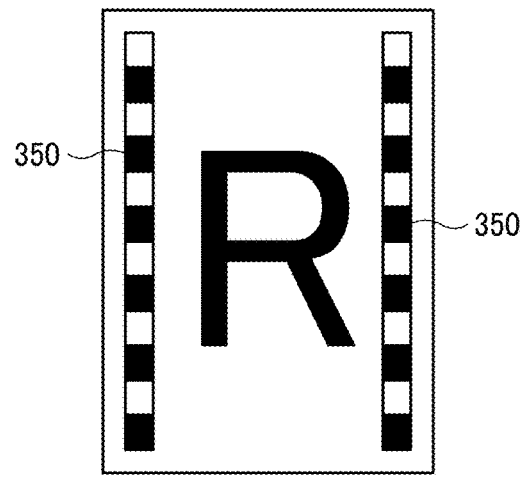
FIG. 15B is a diagram illustrating an image including the RIP image illustrated in FIG. 15A with a reference point image added to each side of the RIP image.

Referring now to FIGS. 15A and 15B, a description is given of the reference point image.

FIGS. 15A and 15B illustrate an example of addition of the reference point image according to the present embodiment.

Specifically, FIG. 15A is a diagram illustrating an RIP image. FIG. 15B is a diagram illustrating an image including the RIP image illustrated in FIG. 15A with a reference point image added to each side of the RIP image.

As illustrated in FIG. 15B, a color bar 350 is added as a reference point image. The color bar 350 is a bar-shaped image having different colors between adjacent segments or areas.

Figure 16:
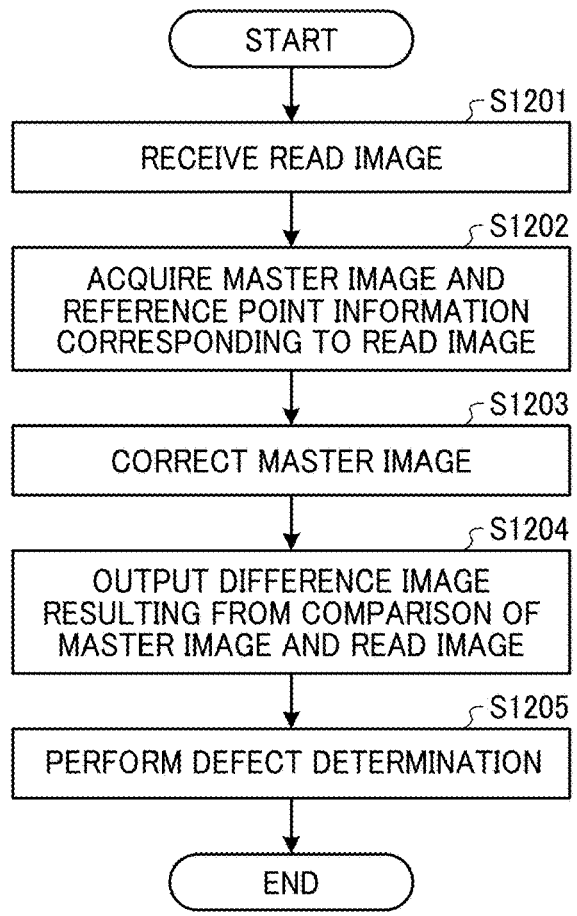
FIG. 16 is a flowchart of a comparative inspection process.

Referring now to FIG. 16, a description is given of a comparative inspection process executed by the comparative inspection unit 215 according to the present embodiment.

FIG. 16 is a flowchart of the comparative inspection process according to the present embodiment.

As illustrated in FIG. 16, in step S1201, the comparative inspection unit 215 acquires or receive a read image from the print image reading unit 214.

In step S1202, the comparative inspection unit 215 acquires a master image and a reference point selection result table from the buffer 213.

In step S1203, the comparative inspection unit 215 corrects the master image so as to conform to the read image, based on the read image and the information included in the reference point selection result table.

After completing the operation of step S1203, in step S1204, the comparative inspection unit 215 compares the pixels constructing the master image and the pixels constructing the read image to extract a difference. In other words, the comparative inspection unit 215 outputs a difference image resulting from the comparison of the master image and the read image. When the image formation and output is suitably executed, the difference between the master image and the read image is relatively small. As a result, the corresponding pixels of the images have almost the same tones. That is, the difference (i.e., the difference value) resulting from the subtraction is close to 0. By contrast, when the image formation and output is not executed as intended, the corresponding pixels have different tones. That is, the difference (i.e., the difference value) resulting from the subtraction is not close to 0.

In step S1205, the comparative inspection unit 215 compares the difference value thus generated (i.e., the calculated difference) with a given threshold to perform a defect determination. In step S1205, the comparative inspection unit 215 may set a threshold for each of the RGB planes and compare the threshold with the calculated difference. Alternatively, the comparative inspection unit 215 may calculate the color shift of the entire lightness, hue, and saturation, based on the difference for each of the RGB planes and compare the calculated value with a threshold set for the value to determine the defect. As a result of such comparison, when the generated difference value exceeds the threshold, the comparative inspection unit 215 determines that the read image has a defect. After determining whether the read image has a defect, the comparative inspection unit 215 notifies the printer 101 of the determination result (as an inspection result).

When acquiring, from the comparative inspection unit 215, the determination result indicating that the read image has a defect, the printer 101 (specifically, the printer control unit 202) notifies the image generation control unit 203 of a reprinting request. In response to the notification, the image generation control unit 203 executes reprinting.

Figure 17:
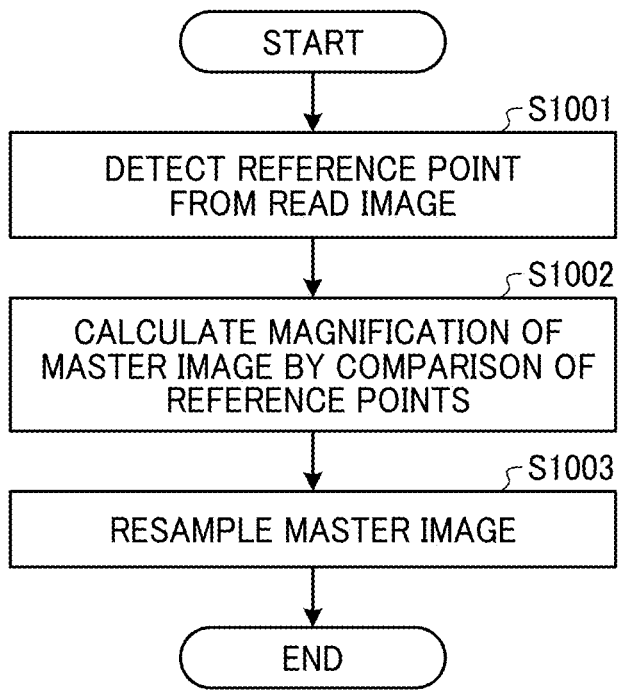
FIG. 17 is a flowchart of an operation of correcting a master image.

Referring now to a flowchart illustrated in FIG. 17, a detailed description is given of the operation of step S1203.

FIG. 17 is a flowchart of an operation of correcting a master image according to the present embodiment.

As illustrated in FIG. 17, in step S1001, based on the reference point selection result table set in the buffer 213, the comparative inspection unit 215 extracts a corresponding reference point from the read image.

For example, when succeeding in acquiring the reference point coordinates extracted from the master image, that is, when succeeding in acquiring the coordinates registered in the reference point selection result table, the comparative inspection unit 215 performs the alignment based on the reference point coordinates. Specifically, the comparative inspection unit 215 performs pattern matching between a 32×32 pixel area centered on the reference point coordinates on the read image and a reference point image that is a 16×16 pixel image centered on the reference point coordinates on the master image, to search the 32×32 pixel area for an area that is a best match for the reference point image. Then, the comparative inspection unit 215 uses the center point of the area in the read image as the reference point coordinates.

In a case in which the master image generating unit 211 adds the reference point image to the master image, in step S1001, the comparative inspection unit 215 performs matching, for each area, between a reference point image portion set in the master image and a reference point image portion of the read image to specify the best matching portions and extracts the reference point coordinates from each other.

After extracting the reference point coordinates in step S1001, in step S1002, the comparative inspection unit 215 calculates a coordinate conversion coefficient of the projection conversion of the master image with respect to the read image, from the reference point coordinates on the master image and the reference point coordinates on the read image. In other words, the comparative inspection unit 215 calculates magnification of the master image by comparison of the reference points.

In step S1003, the comparative inspection unit 215 resamples the master image with the coordinate conversion coefficient calculated in step S1002 so that the read image matches the master image in print image size.

As described above, when the comparative inspection unit 215 succeeds in acquiring the reference point coordinates extracted from the master image, that is, when the reference point coordinates extracted from the master image are set, the comparative inspection unit 215 performs pattern matching between an area centered on the reference point coordinates on the read image and an area centered on the reference point coordinates on the master image, to align the read image and the master image. Then, the comparative inspection unit 215 performs inspection from step S1204.

By contrast, when the master image generating unit 211 adds the reference point image to the master image, that is, when the reference point coordinates extracted from the master image are not set, the comparative inspection unit 215 aligns the read image and the master image, based on the reference point image in the master image and the reference point image in the read image. Then, the comparative inspection unit 215 performs inspection from step S1204. Note that, in a case in which the master image generating unit 211 adds the reference point image to the master image, the master image generating unit 211 transmits the information on the addition of the reference point image to the printer 101. In response to the information transmitted, the image generation control unit 203 adds the reference point image to the RIP image to form and output the image. As a result, the print image reading unit 214 reads the image including the reference point image. In other words, the read image acquired by the print image reading unit 214 includes the reference point image.

In the present embodiment, as an example case, a point farther from the center of the image is selected from a reference point candidate of a P pattern included in the P pattern availability table generated as illustrated in FIG. 7 and a reference point candidate obtained by corner extraction. Since a reference point set at a position closer to each of the four corners of a read image is deviated greater when the read image is contracted, it facilitates the detection of contraction of the read image to set the reference point at a position as close to each of the four corners of the read image as possible.

Alternatively, generation of the P pattern availability table as illustrated in FIG. 7 may be omitted. In this case, the reference point candidates obtained by corner extraction may be used alone. Thus, when the aforementioned P pattern is unavailable, the extra processing is omitted, thus reducing the processing load.

In the present embodiment, as described above with reference to FIGS. 12A to 12D as an example case, different filters are applied to the areas A to D illustrated in FIG. 9 at the time of corner extraction. FIGS. 12A to 12D are filters for extracting different corner positions. Specifically, FIG. 12A illustrates a filter for extracting the upper left corner. FIG. 12B illustrates a filter for extracting the upper right corner. FIG. 12C illustrates a filter for extracting the lower left corner. FIG. 12D illustrates a filter for extracting the lower right corner. The filters correspond to the corners to be extracted from the areas A to D illustrated in FIG. 9.

However, the purpose of corner extraction is to extract characteristic points of an image. The areas A to D and FIGS. 12A to 12D may not always correspond to each other one by one as in the present embodiment. Alternatively, all of the filters illustrated in FIGS. 12A to 12D may be applied to each of the areas A to D to extract various kinds of corners from each of the areas A to D.

Targeting the types of corners to be extracted from each of the areas A to D as in the present embodiment allows extraction of corners that are highly likely to be extracted empirically alone, thus reducing the load and enhancing the efficiency of the processing.

In the present embodiment, as described above with reference to FIG. 8 as an example case, the corners of the edge image are extracted after an edge of an image is extracted. Generating the edge image first allows targeting an object to be extracted as a corner, thus reducing the processing load. However, the generation of the edge image is dispensable. A corner extraction process may be performed on the master image, without generating the edge image.

In the present embodiment, as an example case, the master image generating unit 211 adds the color bar 350 as illustrated in FIG. 15B as a reference point image. According to another example or embodiment, the master image generating unit 211 may add, as a reference point image, a cross mark image 360, which is an image of continuous cross marks, as illustrated in FIG. 18.

Figure 18:
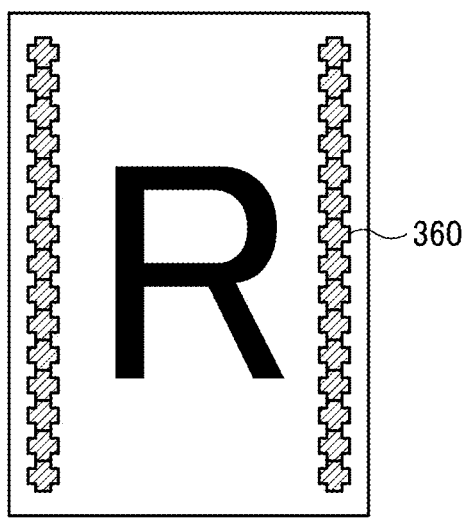
FIG. 18 is a diagram illustrating a reference point image according to another embodiment of the present disclosure.

As illustrated in FIG. 15B and FIG. 18, the reference point image preferably has a given length (e.g., 0.5 mm or more) in each of the X direction and the Y direction. Such a configuration prevents the inspecting apparatus 103 from not being able to properly read the reference point image at the time of scanning, or from being unable to distinguish between the reference point image and extraneous matter such as paper dust or dust attached to the scanner or extraneous matter such as paper dust or dust on a recording medium. If a non-linear distortion is added to the read image, setting reference points such as so-called trim marks at the four corners of the image is not enough for accurate alignment. However, as described above, when the reference point image has a given length in each of the X direction and the Y direction, the inspecting apparatus 103 performs the alignment as appropriate, based on the reference point image in the master image and the reference point image in the read image, even in a case in which the non-linear distortion is added to the read image.

Note that the reference point image is not limited to the image illustrated in FIG. 15B or the image illustrated in FIG. 18. An image having a certain size around each of the four corners of each of the areas A to D illustrated in FIG. 9 may be set as a reference point image.

In the present embodiment, as an example case, the printer 101 sends a printed sheet (i.e., a recording medium) to the inspecting apparatus 103. The print image reading unit 214 of the inspecting apparatus 103 reads an image formed on the printed sheet (i.e., the recording medium). As another example, the printer 101 may have the function of the print image reading unit 214.

As described above, in the inspecting apparatus 103 according to the present embodiment, when the master image generating unit 211 extracts a reference point portion from a master image, the reference point selection result table is stored in the buffer 213, indicating the reference point based on the extracted result. When the reference point is not set based on the reference point portion extracted from the master image, the master image is stored with the reference point image added to a blank area or a margin area of the master image. The comparative inspection unit 215 aligns the master image and the read image, based on the information of the reference point selection result table or the reference point image included in the master image, and executes a comparison process (that is, an inspection process) of the master image and the read image.

As described above, in a case in which the inspecting apparatus 103 fails to set a reference point based on a master image, which is an image for inspection generated from an output target image, the inspecting apparatus 103 adds a reference point image to the master image to perform alignment by use of the reference point image. In short, the inspecting apparatus 103 aligns images as appropriate even when the reference point is not specified from a target image. In the present embodiment, when the reference point portion is extractable from the master image, the inspecting apparatus 103 aligns the master image and the read image without adding the information indicating the reference point (i.e., the reference point image) to a blank area or a margin area. That is, the inspecting apparatus 103 aligns the images without unnecessarily consuming the colorant for reference marks.

In the image processing system 1 according to the present embodiment, the master image generating unit 211 cooperates with the comparative inspection unit 215 to extract a corner of an edge from an image and generate a reference point candidate. Such a configuration allows extraction of corresponding pixels from the master image and the read image for image alignment even in the case of monochrome printing in which the P pattern is not applied, in a case in which the image has a yellow background, or in a case in which the image is formed on a yellowish sheet.

In the present embodiment, as an example case, the inspecting apparatus 103 serving as an image processing apparatus has been described in combination with the printer 101. Instead of the printer 101, the inspecting apparatus 103 according to an embodiment of the present disclosure may be combined with an image forming apparatus such as a copier, a scanner, a facsimile machine, or a multifunction peripheral (MFP) having at least two of copying, printing, scanning, and facsimile functions.

According to the embodiments of the present disclosure, images are aligned as appropriate even in a case in which a reference point is not specified from a target image.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An image processing apparatus comprising circuitry configured to:
    acquire an output target image to be formed and output;
    generate an image for inspection from the output target image;
    add a reference point image to an area of the image for inspection in a case in which the circuitry fails to set a reference point based on the image for inspection; and
    align the reference point added to the image for inspection and the reference point image of a read image of the output target image formed on a recording medium with the reference point image added in response to adding the reference point image to the image for inspection, to compare the image for inspection with the read image to perform inspection.

2. The image processing apparatus according to claim 1, wherein the area is a blank area.

3. The image processing apparatus according to claim 1, wherein the area is a margin area.

4. The image processing apparatus according to claim 1, wherein the reference point image is an image having a given length in each of an X direction and a Y direction.

5. The image processing apparatus according to claim 4, wherein the reference point image is a bar-shaped image having different colors between adjacent segments.

6. The image processing apparatus according to claim 4, wherein the reference point image is an image of continuous cross marks.

7. The image processing apparatus according to claim 1, wherein the circuitry is configured to:
    superimpose a pattern on the output target image to generate the image for inspection;
    determine whether to use the pattern as the reference point, based on an image at a position of the pattern in the image for inspection; and
    add the reference point image to the area of the image for inspection in a case in which the circuitry fails to set the reference point based on a result of determination as to whether to use the pattern as the reference point.

8. An image processing system comprising the image processing apparatus according to claim 1.

9. An image processing method comprising:
    acquiring an output target image to be formed and output;
    generating an image for inspection from the output target image;
    adding a reference point image to an area of the image for inspection in a case in which a reference point is not set based on the image for inspection; and
    aligning the reference point added to the image for inspection and the reference point image of a read image of the output target image formed on a recording medium with the reference point image added in response to the adding the reference point image to the image for inspection, to compare the image for inspection with the read image to perform inspection.

10. A non-transitory, computer-readable storage medium storing computer-readable program code that causes a computer to perform an image processing method, the method comprising:
    acquiring an output target image to be formed and output;
    generating an image for inspection from the output target image;
    adding a reference point image to an area of the image for inspection in a case in which a reference point is not set based on the image for inspection; and
    aligning the reference point added to the image for inspection and the reference point image of a read image of the output target image formed on a recording medium with the reference point image added in response to the adding the reference point image to the image for inspection, to compare the image for inspection with the read image to perform inspection.

* * * * *